(12) United States Patent
Matsumiya et al.

(10) Patent No.: US 6,333,696 B1
(45) Date of Patent: Dec. 25, 2001

(54) COLLISION PREVENTING DEVICE FOR A MEASURING APPARATUS AND MEASURING APPARATUS HAVING COLLISION PREVENTING UNIT

(75) Inventors: Sadayuki Matsumiya; Masanori Arai, both of Kanagawa (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 09/712,298

(22) Filed: Nov. 15, 2000

(30) Foreign Application Priority Data

Nov. 22, 1999 (JP) .................................................. 11-331260

(51) Int. Cl.[7] .................................................. G08B 21/00
(52) U.S. Cl. .................. 340/686.5; 340/679; 340/686.1; 340/686.6
(58) Field of Search ............................. 340/686.5, 686.1, 340/686.6, 687, 689, 691.1, 679

(56) References Cited

U.S. PATENT DOCUMENTS

| | | | |
|---|---|---|---|
| 4,462,162 | * 7/1984 | McMurtry | 33/174 |
| 5,048,194 | * 9/1991 | McMurtry | 33/558 |
| 5,056,365 | 10/1991 | Gray et al. | 73/432.1 |
| 5,583,443 | * 12/1996 | McMurtry et al. | 324/601 |
| 6,052,628 | * 4/2000 | Hong | 700/195 |

* cited by examiner

*Primary Examiner*—Jeffery Hofsass
*Assistant Examiner*—Son Tang
(74) *Attorney, Agent, or Firm*—Oliff & Berridge, PLC

(57) ABSTRACT

A collision preventing device includes: a holder 20; an annular collision detecting portion 30; holding means 40; and switching means 50. The holder 20 is attached to a non-contact probe 18. The annular collision detecting portion 30 covers the non-contact probe 18. The holding means 40 holds the collision detecting portion 30 displaceably and returnably in a Z-axis direction with respect to the holder 20. The switching means 50 detects a relative displacement occurring between the holder 20 and the collision detecting portion 30 and commands a driving system to stop the movement of the non-contact probe 18 or move the non-contact probe 18 in a escape direction. Accordingly, it is possible to prevent the breakage of the non-contact probe 18, the main body of the measuring apparatus, the work, and the like due to the collision.

18 Claims, 13 Drawing Sheets

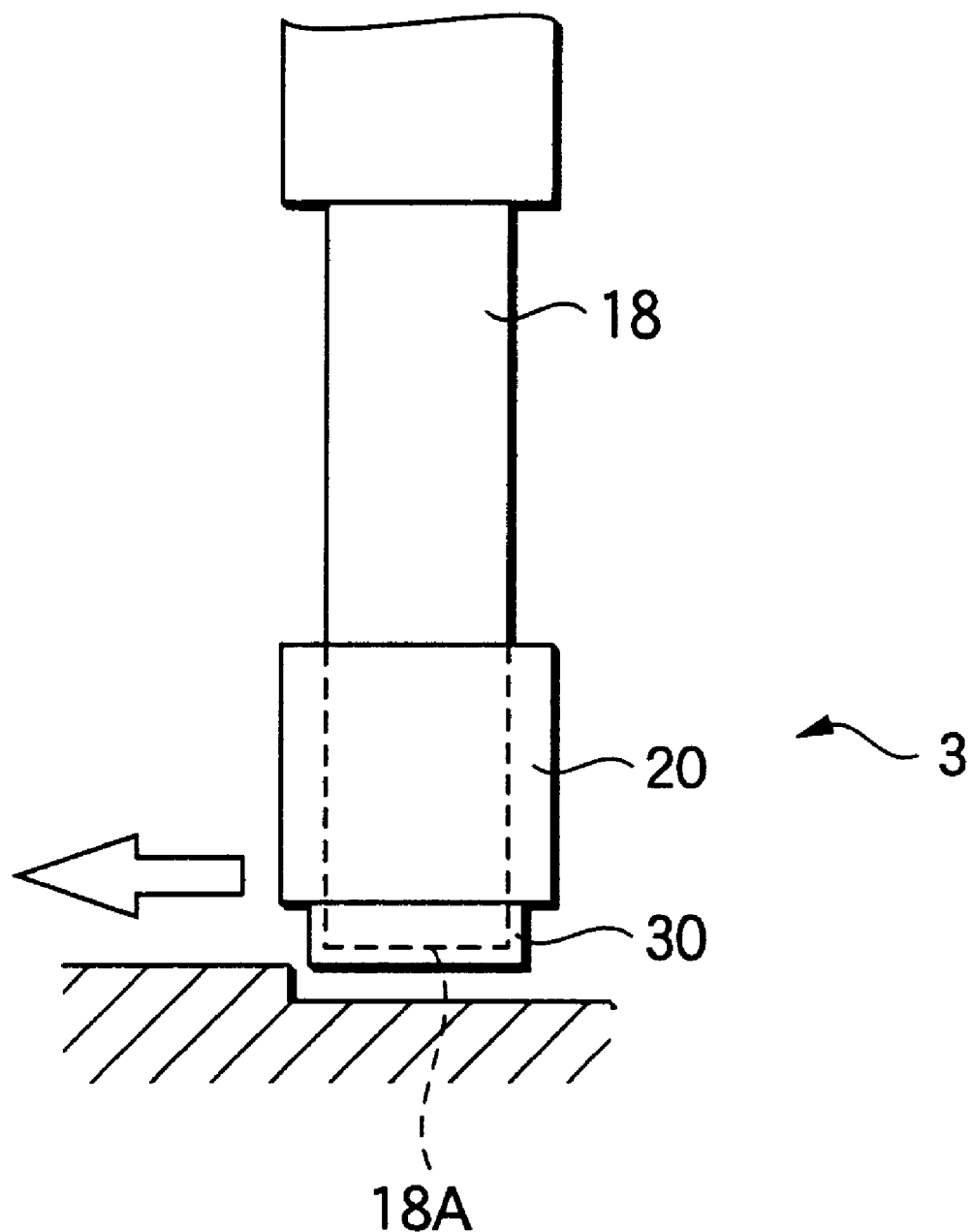

COLLISION PREVENTING DEVICE FOR A MEASURING APPARATUS AND MEASURING APPARATUS HAVING COLLISION PREVENTING UNIT

BACKGROUND OF THE INVENTION

1. Field of the Invention

The present invention relates to a collision preventing device for a measuring apparatus and a measuring apparatus having a collision preventing unit. More particularly, the present invention relates to a collision preventing device for a measuring apparatus and a measuring apparatus having a collision preventing unit, the measuring apparatus measuring dimensions and the like of a work while relatively moving the work and a non-contact probe by a driving system.

2. Description of the Related Art

As a measuring apparatus using a non-contact probe, a non-contact view measuring CMM (Coordinate Measuring Machine) is known. The non-contact view measuring CMM is capable of measuring the dimensions and the like of a work on the basis of an image fetched by a non-contact probe while moving the work or the non-contact probe in an X-axis direction, a Y-axis direction, and a Z-axis direction that are mutually perpendicular to each other.

In FIG. 13, a non-contact view measuring CMM 1 is provided with a measuring table 11 and a bridge-type frame 12. The bridge-type is capable of moving on the measuring table 11 in the Y-axis direction. A guide rail 13 is attached to one side of the measuring table 11, and one leg 121 of the bridge-type frame 12 moves while sliding in the Y-axis direction along this guide rail 13.

Here, the relative displacement of the bridge-type frame 12 and the guide rail 13 is measured by a displacement detecting unit including a scale 14 disposed on the guide rail 13 and a detector (not shown) disposed on the leg 121. It should be noted that an air bearing or the like is provided on the underside of the other leg 122 of the bridge-type frame 12, whereby the leg 122 is slidably supported on the measuring table 11.

Meanwhile, an X-axis slider 15 is disposed on a bridge 123 in such a manner as to be slidable in the X-axis direction, and the relative displacement of the bridge 123 and the X-axis slider 15 is measured by a displacement detecting unit similar to that for the Y-axis direction. The bridge 123 bridges between the legs 121 and 122 of the bridge-type frame 12. Further, a Z-axis supporting member 16 is disposed on the X-axis slider 15, and this Z-axis supporting member 16 is provided with a Z-axis spindle 17 which is slidable in the Z-axial direction. A non-contact probe 18 is attached to the Z-axis spindle 17, and this non-contact probe 18 includes a CCD camera 181 and an objective 182 attached to the CCD camera 181.

The non-contact probe 18 is movable in the X-, Y-, and Z-axis directions by a driving system (not shown) provided in the non-contact view measuring CMM 1. Although not shown, the driving system has an X-axis driving system, a Y-axis driving system, and a Z-axis driving system for moving the non-contact probe to in the X-, Y-, and Z-axis directions. For example, the driving system is adapted to be operated manually or by inputting coordinates to a computer (not shown) connected to the driving system.

The measurement, the non-contact probe 18 is first moved in the X-, Y-, and Z-axis directions along the work by the driving system. Next, in a state in which the non-contact probe 18 is positioned at a desired position, an image of the work is fetched by the CCD camera 181. The dimensions and the like of the work are then determined from this image.

The non-contact probe 18 of the above-described non-contact view measuring CMM 1 is used at a position proximate to the work. At the time of measurement, in particular, the non-contact probe 18 is moved in a three-dimensional direction, but there are cases where the non-contact probe 18 is made to collide against the work due to the carelessness of an operator or such as an error in the input setting of coordinates to the computer. In addition, in the case of an apparatus having a number of devices, such as a combination measuring apparatus, a mechanism is often adopted in which the devices are stored except when necessary, and a device, when necessary, is moved to a normal position so as to be used. In such a case as well, unless the distance between the device and the work is proper, there is a possibility of causing the device to collide against the work.

Since the above-described non-contact probe 18, the devices, and the line are not provided with the collision detecting capability in themselves, even if the non-contact probe 18, for instance, collides against the work, the driving force of the driving system continues to be applied to the non-contact probe 18. The driving system stops only when an overload has been applied to the driving system, or an overcurrent has occurred, or an error signal such as a servo tracking error in the driving system has been issued from the driving system. For this reason, there is a problem in that large damage may be possibly imparted to the main body, the driving system, and the non-contact probe 18 of the non-contact view measuring CMM 1 or the work.

SUMMARY OF THE INVENTION

The object of the invention is to provide a collision preventing device for a measuring apparatus and a measuring apparatus having a collision preventing unit which make it possible to prevent the breakage of the non-contact probe, the main body of the measuring apparatus, the work, and the like due to collision.

To attain the above object, the collision preventing device for a measuring apparatus and a measuring apparatus having a collision preventing unit in accordance with the invention has the following arrangements.

The collision preventing device for a measuring apparatus, according to the present invention, measures dimensions and the like of a work while relatively moving the work and a non-contact probe by a driving system and comprises:

a holder attached to the non-contact probe;

an collision detecting portion covering the non-contact probe;

holding means for holding the collision detecting portion displaceably with respect to the holder; and a switch for detecting a relative displacement between the holder and the collision detecting portion and for commanding the driving system to stop the relative movement of the work and the non-contact probe or relatively move the work and the non-contact probe in a escape direction in which the work and the non-contact probe separate from each other.

According to this invention, when, for example, the non-contact probe has approached the work, the collision detecting portion covering the non-contact probe firstly collides against the work. Then, a relative displacement occurs between the collision detecting portion and the holder. When the relative displacement has occurred between them, the switch immediately detects the relative displacement, and commands the driving system of the measuring apparatus to stop the relative movement or relatively move the work and the non-contact probe in the escape direction. As a result, the movement of the non-contact probe or the work is stopped, or the work and the non-contact probe are relatively moved in the escape direction.

Accordingly, when the non-contact probe is about to collide against the work, since the collision detecting portion covering the non-contact probe is firstly brought into contact with the work, it is possible to prevent the non-contact probe itself to collide against the work, thereby making it possible to prevent the breakage of the non-contact probe and the main body of the measuring apparatus. In addition, since the collision between the collision detecting portion and the work is immediately detected, and the movement of the non-contact probe or the work is stopped, or the work and the non-contact probe are relatively moved in the escape direction, it is possible to prevent damage or the like from being caused to the work. In particular, if the collision detecting portion is formed of a light or soft material such as a plastic or rubber, it is possible to reliably prevent damage or the like from being caused to the work. This collision detection portion may be ring-shaped. Further, the holding member holds the collision detecting portion displaceably with respect to the holder. Namely, the hold member holds the collision detecting portion in such a manner that the collision detecting portion can move from an original position with respect to the holder and return to the original position. Accordingly, the relative displacement between the holder and the collision detecting portion can be detected. Therefore the collision can be detected.

In the above-mentioned collision preventing device, it is preferable that the driving system comprises a first driving system and a second driving system for relatively moving the work and the non-contact probe in first and second directions that are perpendicular to each other, respectively.

In accordance with this invention, the collision preventing device for a measuring apparatus can be applied to a three-dimensional measuring apparatus in which the work and the non-contact probe are relatively moved in the first and second directions that are perpendicular to each other, e.g., a non-contact view measuring CMM or the like.

In the above-mentioned collision preventing device, it is also preferable that the holding means includes first holding means for holding the collision detecting portion displaceably in a first direction with respect to the holder, the first holding means having: a sliding member fixed to one of the holder and the collision detecting portion at one end thereof and attached to the other of the holder and the collision detecting portion at the other end thereof slidably in the first direction; and a first resilient member disposed between the holder and the collision detecting portion and holding the collision detecting portion displaceably in the first direction with respect to the holder, and the switch includes a first switch for detecting a relative displacement between the holder and the collision detecting portion in the first direction. Further, it is preferable that the holding means includes second holding means for holding the collision detecting portion displaceably in a second direction perpendicular to the first direction with respect to the holder, the second holding means having: an intermediate member disposed between the holder and the collision detecting portion; at least one positioning means disposed the intermediate member and the collision detecting portion and for detecting a respective displacement between the holder and the collision detecting portion in the second direction; and a second resilient member disposed between the intermediate member and the collision detecting portion and holding the collision detecting portion displaceably in the second direction with respect to the holder, the sliding member is fixed to one of the holder and the intermediate member at one end thereof and attached to the other of the holder and the intermediate member slidably in the first direction at the other end thereof and the first resilient member is disposed between the holder and the intermediate member and holds the intermediate member displaceably in the first direction with respect to the holder, and the switch has a second switch for detecting the relative displacement between the holder and the collision detecting portion in the second direction. The positioning means may include: a ball disposed on one of the intermediate member and the collision detecting portion; and two rollers engaged with the ball and disposed on the other of the intermediate member and the collision detecting portion, and the second resilient member holds the ball and the two rollers engageably and disengageably.

In accordance with this invention, the collision from any three-dimensional direction can be detected since the holding means includes the first holding means for holding the collision detecting portion displaceably in the first direction with respect to the holder and the second holding means for holding the collision detecting portion displaceably in the second direction with respect to the holder.

In addition, in the collision in the first direction, if, for instance, the non-contact probe is lowered, the collision detecting portion comes into contact with the work, and a relative displacement in the first direction occurs between the collision detecting portion and the holder. Specifically, the collision detecting portion is slid in the first direction relative to the holder by means of the intermediate member and the sliding member. When the non-contact probe is escaped, the intermediate member is returned to its original position by the first resilient member, so that the collision detecting portion is also returned to its original position. Accordingly, since the first holding means has a simple structure, the collision preventing device can be constructed easily and economically.

Meanwhile, in the collision in the second direction, when, for instance, the non-contact probe is moved in the second direction, the collision detecting portion collides against the work, and a relative displacement occurs in the second direction between the collision detecting portion and the holder. Specifically, since the collision detecting portion tends to be displaced in the second direction with respect to the intermediate member against the second resilient member, the ball and the rollers of the positioning means are separated from each other, and a relative displacement occurs in the second direction between the collision detecting portion and the intermediate member. Since the intermediate member is nondisplaceable in the second direction with respect to the holder by means of the sliding member, a relative displacement also occurs in the second direction between the collision detecting portion and the holder. If the non-contact probe is escaped, the collision detecting portion is returned to its original position by means of the second resilient member, and the ball and the rollers of the positioning means are engaged with each other. Since the positioning means comprised of the ball and the two rollers are used, it is possible to effect the positioning of the collision detecting portion with respect to the holder with high accuracy. The above-mentioned positioning means may have: a ball disposed on one of the intermediate member and the collision detecting portion; and a pair of holding member disposed respectively on the intermediate member and the collision detecting portion and clamping the ball between surfaces of the holding members respectively formed in substantially conical shapes. In this case, the second resilient member holds the ball and the pair of the holding members engageably and disengageably. The above-mentioned first switch may have: a switch portion having a lever swingably in the first direction; and a dog fixed to the sliding member and swing the lever on the basis of a movement of the sliding member, and detect a swing state of the lever and command the driving system to stop the relative movement of the work and the non-contact probe in the first direction or relatively move the work and the non-contact probe in the escape direction.

Further, in the collision preventing device, it is preferable the second switch has: a collision detecting circuit having contacts formed between the ball and the two rollers of the positioning means and arranged electrically in series, and detects an open state of the collision detecting circuit and commands the driving system to stop the relative movement of the work and the non-contact probe in the second direction or relatively move the work and the non-contact probe in the escape direction.

In accordance with this invention, by using the ball and the rollers of the positioning means as the switch, it is possible to reduce the number of component parts as compared with the case where a switch is provided separately, and this arrangement is economical in terms of cost.

In the above-mentioned collision preventing device, it is also preferable that the positioning means comprises: at least one first positioning means having a ball disposed on one of the intermediate member and the collision detecting portion, and two rollers engaged with the ball and disposed on the other of the intermediate member and the collision detecting portion; and at least one second positioning means having a ball disposed on one of the intermediate member and the collision detecting portion, and a pair of holding member disposed respectively on the intermediate member and the collision detecting portion and clamping the ball between surfaces of the holding members respectively formed in substantially conical shapes, and the second resilient member holds the ball and the two rollers of the first positioning member engageably and disengageably.

In accordance with this invention, the second holding means uses the first positioning means comprised of the ball and the two rollers and the second positioning means comprised of the ball and the pair of holding members having substantially conical surfaces. Namely, since at least two of the at least three positioning means arranged between the intermediate member and the collision detecting portion have a simple structure made up of the ball and the pair of holding members having substantially conical surfaces, the positioning means can be easily and economically constructed.

The measuring apparatus for measuring dimensions and the like of a work by a non-contact probe, according to the present invention, comprising:

a driving system relatively moving the work and the non-contact probe; and a collision preventing unit for preventing the non-contact probe from colliding with the work, the collision preventing unit comprising:

a holder attached to the non-contact probe;

a collision detecting portion covering the non-contact probe;

holding means for holding the collision detecting portion displaceably with respect to the holder; and a switch for detecting a relative displacement between the holder and the collision detecting portion and for commanding the driving system to stop the relative movement of the work and the non-contact probe or relatively move the work and the non-contact probe in a escape direction in which the work and the non-contact probe separate from each other.

According to this invention, when, for example, the non-contact probe has approached the work, the collision detecting portion covering the non-contact probe firstly collides against the work. Then, a relative displacement occurs between the collision detecting portion and the holder. When the relative displacement has occurred between them, the switch immediately detects the relative displacement, and commands the driving system of the measuring apparatus to stop the relative movement or relatively move the work and the non-contact probe in the escape direction. As a result, the movement of the non-contact probe or the work is stopped, or the work and the non-contact probe are relatively moved in the escape direction.

Accordingly, when the non-contact probe is about to collide against the work, since the collision detecting portion covering the non-contact probe is firstly brought into contact with the work, it is possible to prevent the non-contact probe itself to collide against the work, thereby making it possible to prevent the breakage of the non-contact probe and the main body of the measuring apparatus. In addition, since the collision between the collision detecting portion and the work is immediately detected, and the movement of the non-contact probe or the work is stopped, or the work and the non-contact probe are relatively moved in the escape direction, it is possible to prevent damage or the like from being caused to the work. In particular, if the collision detecting portion is formed of a light or soft material such as a plastic or rubber, it is possible to reliably prevent damage or the like from being caused to the work. This collision detection portion may be ring-shaped.

BRIEF DESCRIPTION OF THE DRAWINGS

FIG. 9 is a side elevational view illustrating the operation of the embodiment;

DETAILED DESCRIPTION OF THE PREFERRED EMBODIMENT

Figure 1:
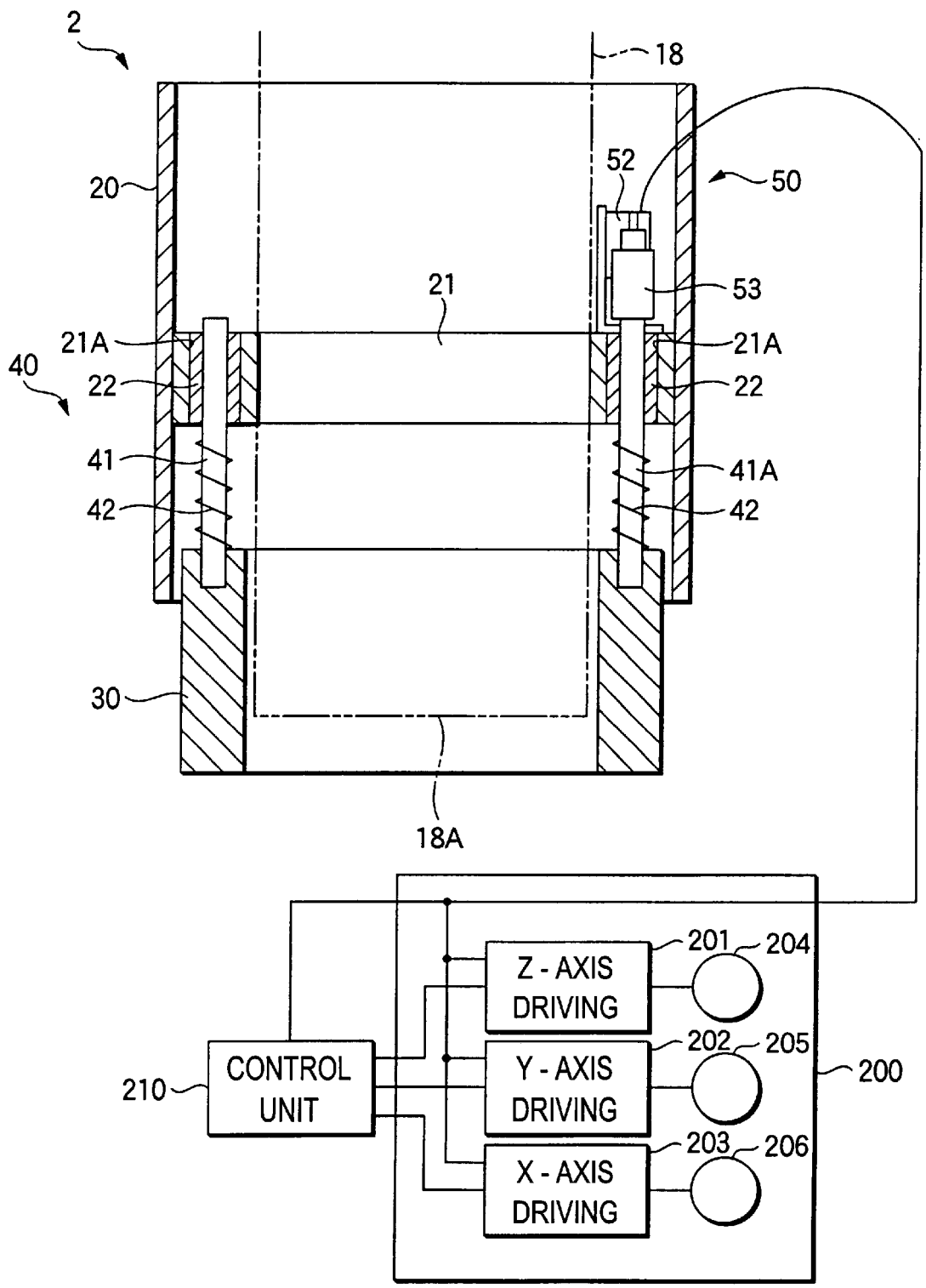
FIG. 1 is an overall view illustrating a first embodiment of a collision preventing device for a measuring apparatus in accordance with the invention.

Referring now to the drawings, a description will be given of the embodiments of the invention.

(First Embodiment)

Figure 13:
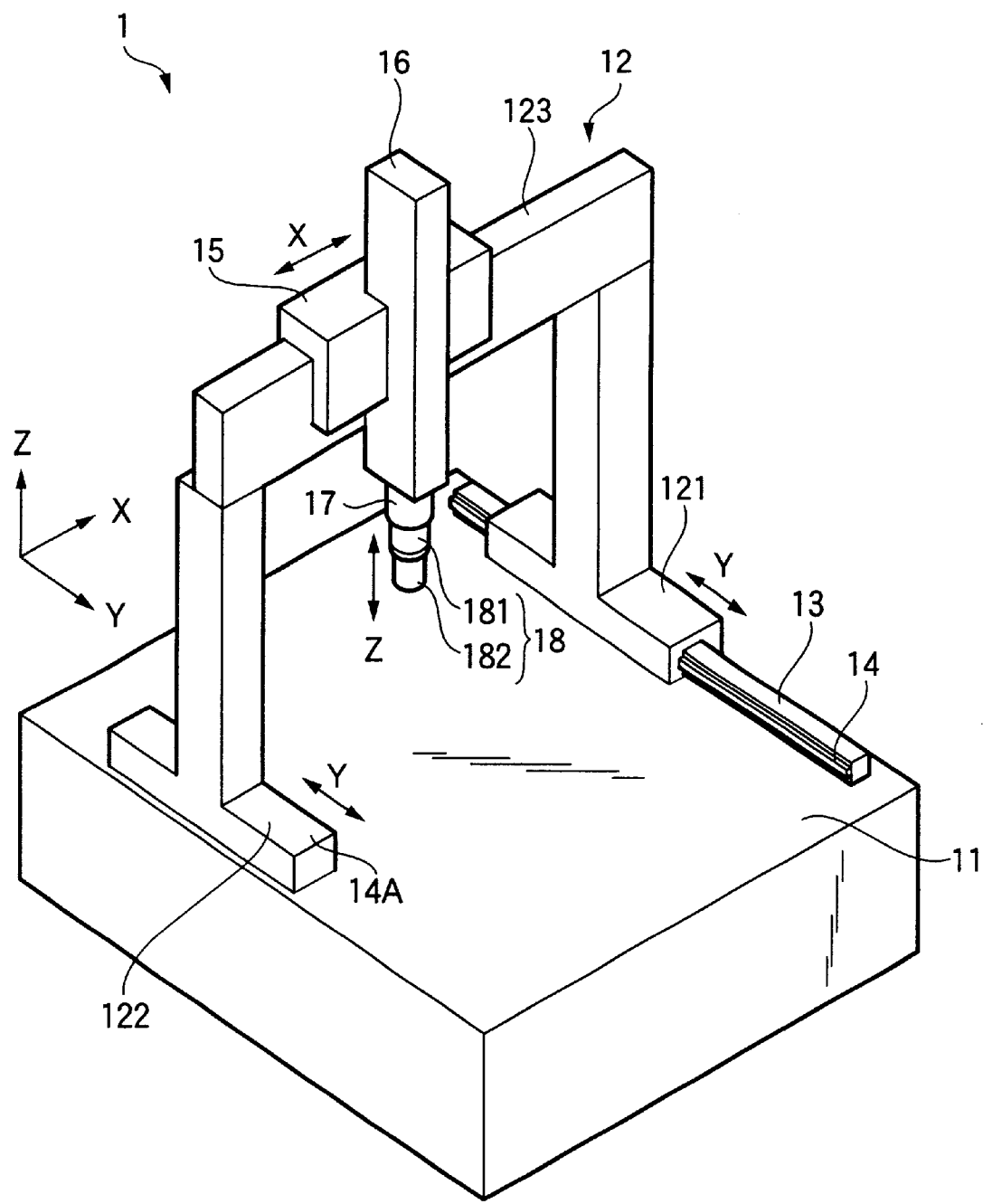
FIG. 13 is an overall view illustrating a conventional non-contact view measuring CMM.

In FIG. 1, a collision preventing device 2 is attached to a non-contact probe 18 of the non-contact view measuring CMM 1 as shown in FIG. 13. This collision preventing device 2 comprises a holder 20, an annular collision detecting portion 30, a holding means 40 and a switching means 50. The holder 20 is attached to the non-contact probe 18. The annular collision detecting portion 30 covers the non-contact probe 18. The holding means 40 holds the collision detecting portion 30 displaceably and returnably in the Z-axis direction with respect to the holder 20. The switching means 50 detects the relative displacement occurring between the holder 20 and the collision detecting portion 30 and commands a driving system 200 to stop the movement of the non-contact probe 18 or move the non-contact probe 18 in an escape direction. Here, "escape direction" means a direction in which the work and the non-contact probe separate from each other.

The holder 20 is formed in a substantially hollow cylindrical shape, and a ring 21 is provided around a cylindrical inner periphery of the holder 20. As this ring 21 is engaged with an outer periphery of the non-contact probe 18, the holder 20 is attached to the non-contact probe 18.

The collision detecting portion 30 is formed in such a manner as to cover the outer periphery of the tip of the non-contact probe 18. In addition, the lower surface of the collision detecting portion 30 is located below a tip surface 18A of the non-contact probe 18 and above the focal point of an objective 182 with respect to the work.

The holding means 40 has two shafts 41 and 41A and a pair of compression helical springs 42. The two shafts 41 and 41A have one end fixed to the collision detecting portion 30 and the other ends disposed slidably on the ring 21 of the holder 20. The pair of compression helical springs 42 serve as resilient members disposed between the holder 20 and the collision detecting portion 30 to hold the collision detecting portion 30 displaceably and returnably with respect to the holder 20.

The two shafts 41 and 41A are positioned by being spaced apart 180° with respect to each other. A pair of sliding holes 21A extending in the Z-axis direction are formed in the ring 21 of the holder 20, and a pair of linear bushes 22 are respectively provided in the sliding holes 21A. The shaft 41 or 41A is slidably inserted in each of the linear bushes 22. As a result, the collision detecting portion 30 is capable of moving only in the Z-axis direction with respect to the holder 20.

The compression helical springs 42 are respectively wound around the two shafts 41 and 41A, and their one ends and other ends are fixed to the holder 20 and the collision detecting portion 30, respectively.

Figure 2:
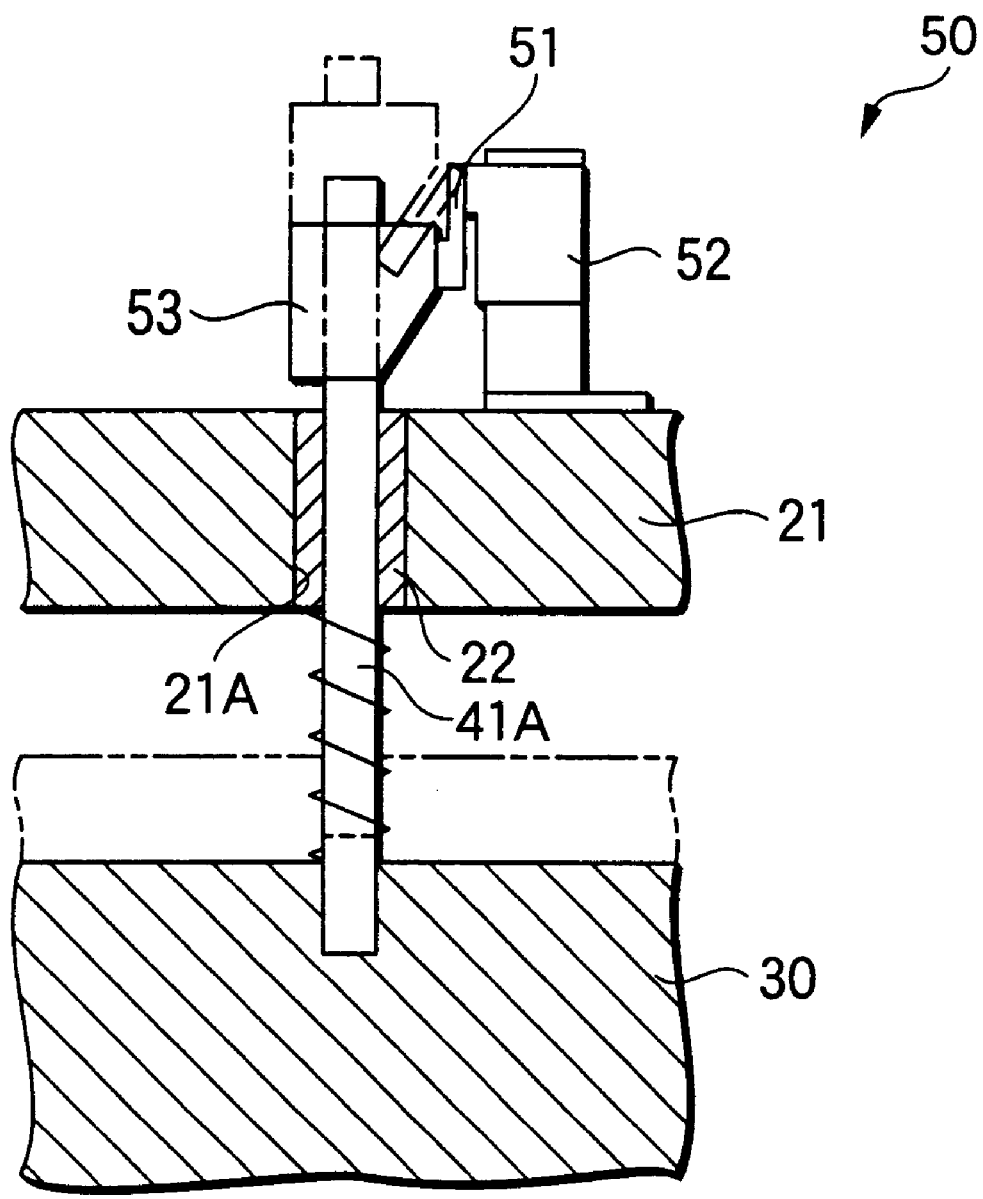
FIG. 2 is a cross-sectional view illustrating essential portions of the embodiment.

As also shown in FIG. 2, the switching means 50 includes a switch portion 52 and a dog 53. The switch portion 52 is disposed on top of the ring 21 of the holder 20 and having a swingable lever 51. The dog 53 is attached to an upper end of the shaft 41A and adapted to swing (open or close) the lever 51 of the switch portion 52 in correspondence with the heightwise position of the shaft 41A. Of these portions, the switch portion 52 is in a closed state when the lever 51 is at an initial position, and the switch portion 52 is set in an open state when the lever 51 is offset (swung) from the initial position.

The driving system 200 is comprised of a Z-axis driving system, a Y-axis driving system and an X-axis driving system as shown in FIG. 1. The Z-axis driving system has a Z-axis driving unit 201 and a Z-axis motor 204. The Y-axis driving system has a Y-axis driving unit 202 and a Y-axis motor 205. The X-axis driving system has an X-axis driving unit 203 and an X-axis motor 206.

A control means 201, for example a personal computer, outputs commands for moving the non-contact probe 18 with respect to X-, Y- and Z-axis to each axis driving system so as to control the movement of the non-contact probe 18 in each axis direction.

The output of the switching means 50 is connected to Z-, Y- and X-axis driving units 201, 202 and 203, and the control means 210. When the switching portion 52 is set in the open state, each axis driving unit stops the movement of the non-contact probe 18 urgently. Namely, each axis driving unit cuts-off the movement commands input from the control means.

When the control means detects the open state of the switching portion 52, the control means can cancel to cut-off the movement commands for each axis driving unit after a predetermined time enough for the stopping of the non-contact probe by each axis driving unit is passed. At this time, the control means can output commands for moving the non-contact probe in the escape direction.

Next, a description will be given of the operation of this embodiment.

Figure 3:
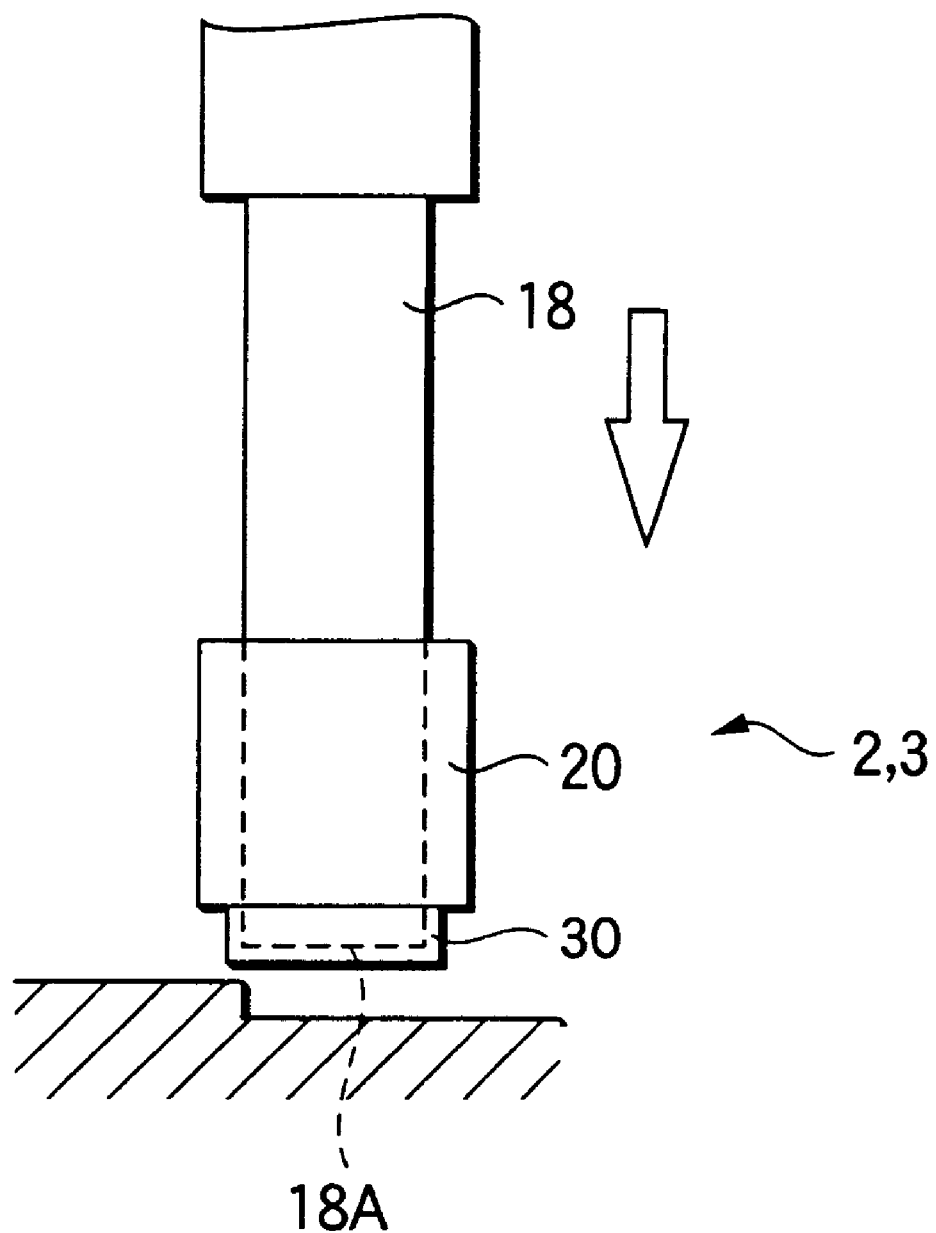
FIG. 3 is a side elevational view illustrating the operation of the embodiment.

In FIG. 3, the non-contact probe 18 with the collision preventing device 2 attached thereto is lowered in the Z-axis direction by the driving system 200. When the non-contact probe 18 is further lowered from the position in which it is close to the works, the collision detecting portion 30 of the collision preventing device 2 firstly collides against the work. When the collision detecting portion 30 collides against the work, a relative displacement in the Z-axis direction occurs between the holder 20 and the collision detecting portion 30. When the collision detecting portion 30 is moved upwardly relative to the holder 20, the shafts 41 and 41A fixed to the collision detecting portion 30 are raised, and the dog 53 fixed to the shaft 41A is also raised. For this reason, the lever 51 is swung upwardly from its initial position, and the switch portion 52 is set in the open state. Then, a command for stopping the movement of the non-contact probe 18 or moving the non-contact probe 18 in the escape direction is sent from the switching means 50 to the driving system 200. Consequently, the lowering of the non-contact probe 18 is stopped, or the non-contact probe 18 is raised, so that it is possible to avoid the breakage of the non-contact probe 18, the main body of the non-contact view measuring CMM 1, and the work. On the other hand, when the collision detecting portion 30 is moved away from the work, the collision detecting portion 30 returns to its initial position relative to the holder 20 by the compression helical springs 42 of the holding means 40, so that the shaft 41A and the dog 53 are lowered. Then, since the lever 51 returns to its initial position while being swung downwardly by the dog 53, the switch portion 52 is set in the closed state.

In accordance with the above-described embodiment, the following advantages can be obtained.

(1) When the non-contact probe 18 approaches the work, the collision detecting portion 30 covering the non-contact probe 18 firstly collides against the work. Then, a relative displacement occurs between the collision detecting portion 30 and the holder 20. When the relative displacement has occurred between them, the switching means 50 immediately detects the relative displacement, and commands the driving system 200 of the non-contact view measuring CMM 1 to stop the movement of the non-contact probe 18 or move the non-contact probe 18 in the escape direction, so that the non-contact probe 18 is stopped or moved in the escape direction.

Accordingly, when the non-contact probe 18 is about to collide against he work, since the collision detecting portion 30 covering the non-contact probe 18 is firstly brought into contact with the work, it is possible to prevent the non-contact probe 18 itself from colliding against the work, thereby making it possible to prevent the breakage of the non-contact probe 18 and the main body of the non-contact view measuring CMM 1. In addition, since the movement of the non-contact probe 18 is stopped or the non-contact probe 18 is moved in the escape direction by immediately detecting the collision between the collision detecting portion 30 and the work, it is possible to prevent damage or the like from being caused to the work. In particular, if the collision detecting portion 30 is formed of a light or soft material such as a plastic or rubber, it possible to reliably prevent damage or the like from being caused to the work.

(2) In the collision in the Z-axis direction, the collision detecting portion 30 comes into contact with the work when the non-contact probe 18 is lowered, and a relative displacement in the Z-axis direction occurs between the collision detecting portion 30 and the holder 20. Specifically, the collision detecting portion 30 is upwardly slid relative to the holder 20 by means of the shaft 41. When the non-contact probe 18 is escaped, the collision detecting portion 30 is returned to its original position by the compression helical springs 42. Accordingly, since the holding means 40 has a simple structure, the collision preventing device 2 can be constructed easily and economically.

(Second Embodiment)

Next, referring to FIGS. 4 to 9, a description will be given of a second embodiment of the collision preventing device for a measuring apparatus in accordance with the invention.

Figure 4:
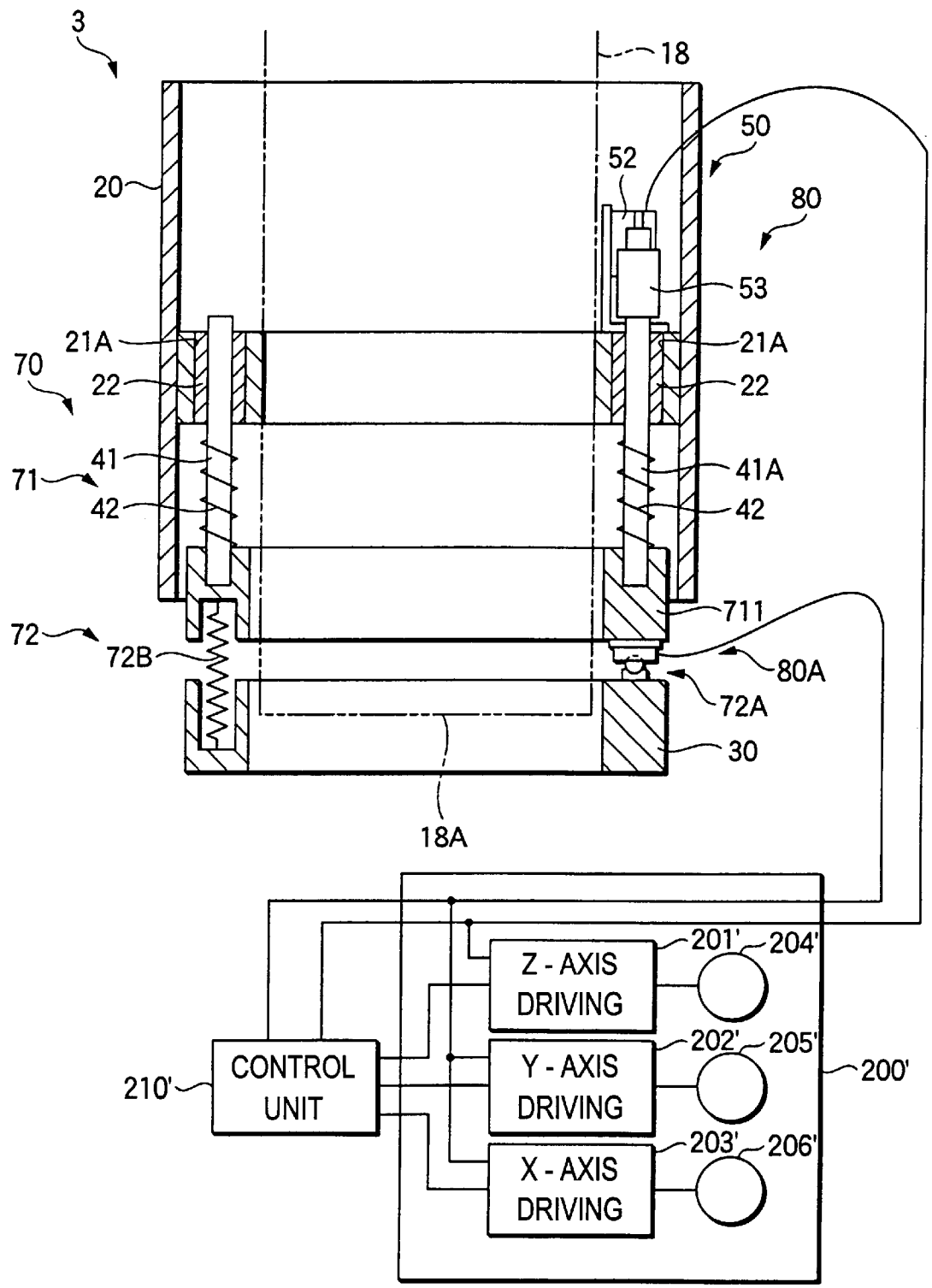
FIG. 4 is an overall view illustrating a second embodiment of the collision preventing device for a measuring apparatus in accordance with the invention.

In FIG. 4, a collision preventing device 3 is attached to the non-contact probe 18 of the non-contact view measuring CMM 1 in the same way as the collision preventing device 2.

The collision preventing device 3 comprises the holder 20 attached to the non-contact probe 18; the collision detecting portion 30 for covering the non-contact probe; a holding means 70 and a switching means 80. The holding means 70 holds the collision detecting portion 30 displaceably and returnably with respect to the holder 20. The switching means 80 detects the relative displacement occurring between the holder 20 and the collision detecting portion 30 and commands the driving system 200' to stop the relative movement or cause the work and the non-contact probe 18 to undergo relative movement in the escape direction. Of these portions, since the holder 20 and the collision detecting portion 30 are arranged in the same way as the holder 20 and the collision detecting portion 30 of the collision preventing device 2, they will be denoted by the same reference numerals and a description thereof will be omitted.

The holding means 70 includes a Z-axis holding means 71 and a X-Y-axis holding means 72. The Z-axis holding means 71 holds the collision detecting portion 30 displaceably and returnably in the Z-axis direction with respect to the holder 20. The X-Y-axis holding means 72 holds the collision detecting portion 30 displaceably and returnably in the X- and Y-axis directions with respect to the holder 20.

The Z-axis holding means 71 has an intermediate member 711, the shafts 41 and 41A and the pair of compression helical springs 42. The intermediate member 711 is disposed between the holder 20 and the collision detecting portion 30. The shafts 41 and 41A have one ends fixed to the intermediate member 711 and the other ends disposed on the holder 20 slidably in the Z-axis direction respectively. The pair of compression helical springs 42 serves as resilient members disposed between the holder 20 and the intermediate member 711 to hold the intermediate member 711 displaceably and returnably with respect to the holder 20. Of these members, the intermediate member 711 is formed in an annular shape and covers the non-contact probe 18. The other arrangements of the Z-axis holding means 71 excluding the intermediate member 711 are similar to those of the holding means 40 of the collision preventing device 2, the other arrangements will be denoted by the same reference numerals, and a description thereof will be omitted.

Figure 6:
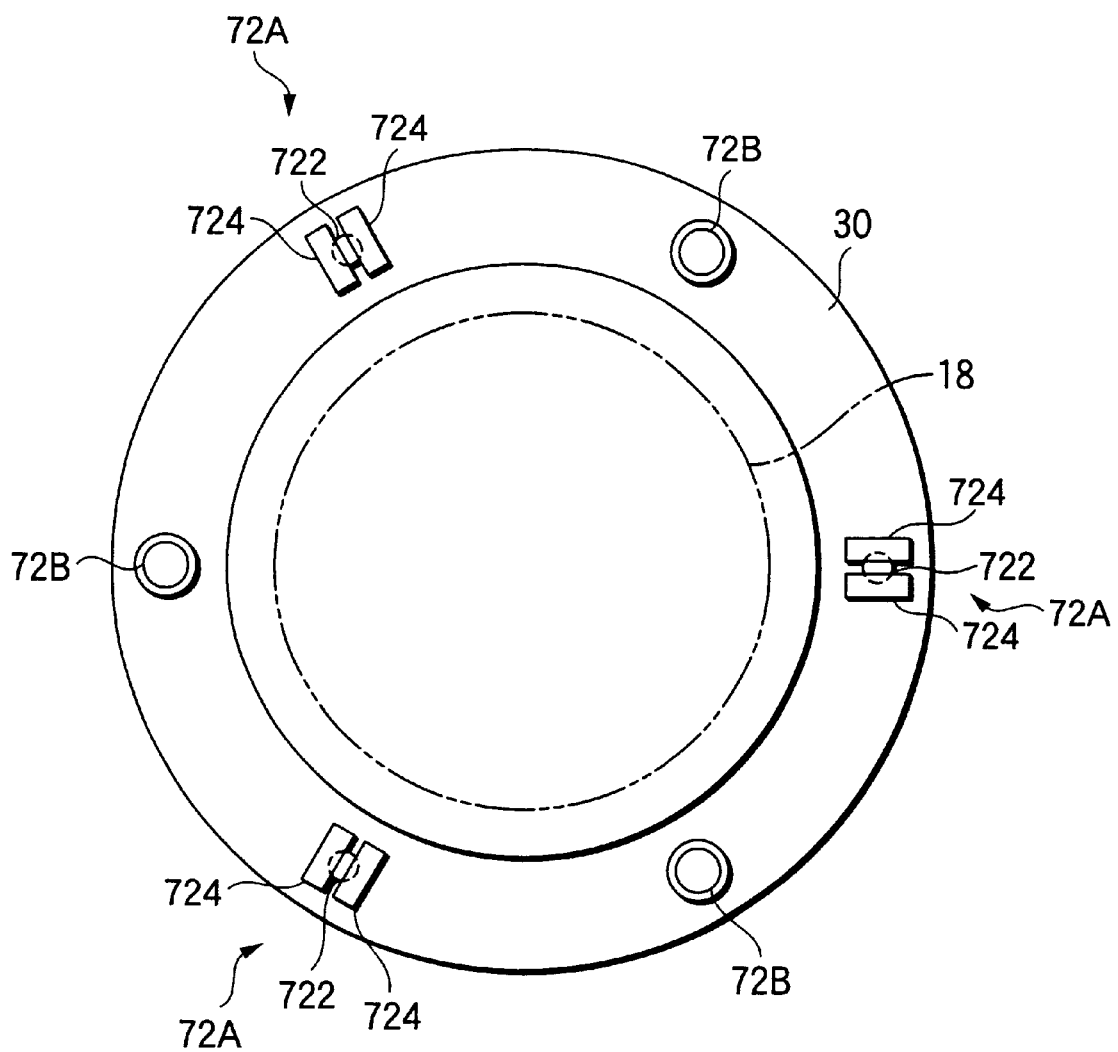
FIG. 6 is a transverse sectional view in accordance with the embodiment.

The X-Y-axis holding means 72 has three positioning means 72A and a helical extension spring 72B. The three positioning means 72A are provided between the intermediate member 711 and the collision detecting portion 30 at equal angles (for example, 120°) as shown in FIG. 6. The helical extension spring 72B serves as a resilient member having one end connected to the intermediate member 711 and the other end connected to the collision detecting portion 30.

Figure 5A:
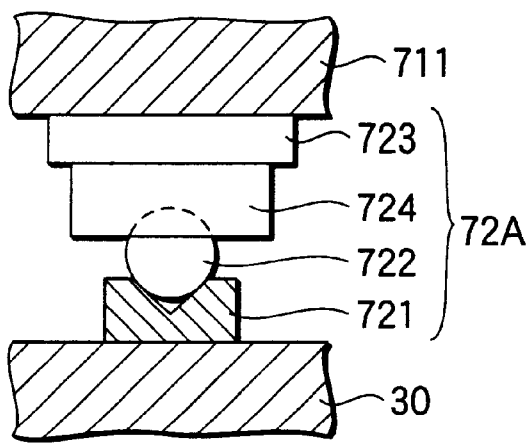
FIG. 5A is a cross-sectional view illustrating essential portions of the embodiment in parallel with a axial direction of a roller.
Figure 5B:
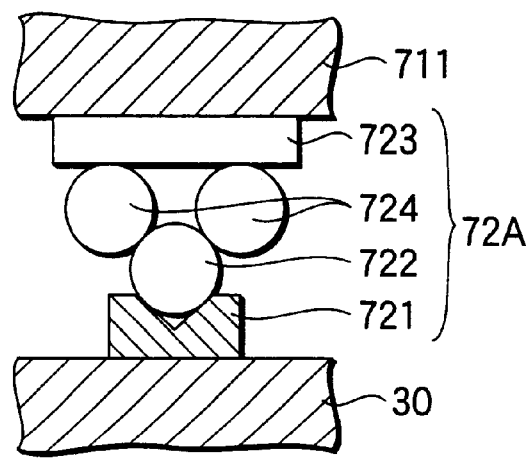
FIG. 5B is a cross-sectional view illustrating essential portions of the embodiment along with a circular direction of a collusion preventing apparatus.

In FIGS. 5A–B and 6, each of the positioning means 72A has a ball 722 and two substantially cylindrical rollers 724. The ball 722 is disposed on an upper surface of the collision detecting portion 30 with an insulator 721 placed therebetween. The two substantially cylindrical rollers 724 are engaged with the ball 722 and disposed on a lower surface of the intermediate member 711 with an insulator 723 placed therebetween. The axial direction of each roller 724 is set to be parallel with a line connecting the center of the ball 722 and the radial center of the collision detecting portion 30. As a result, the collision detecting portion 30 is nondisplaceable in the Z-axis direction and displaceable in the X- and Y-axis directions with respect to the intermediate member 711. Then, the positioning means 72A is held by the helical extension spring 72B in such a manner as to be engageable and disengageable.

The switching means 80 includes a first switching means 50 and a second switching means 80A. The first switching means 50 detects the relative displacement occurring in the Z-axis direction between the holder 20 and the collision detecting portion 30 (intermediate member 711) and commands the driving system 200' to stop the movement of the non-contact probe 18 or move the non-contact probe 18 in the escape direction. The second switching means 80A detects the relative displacement occurring in the X- and Y-axis directions between the holder 20 and the collision detecting portion 30 and commands the driving system 200' to stop the movement of the non-contact probe 18 or move the non-contact probe 18 in the escape direction. Of these switching means, the first switching means 50 and the switching means 50 of the above-described collision preventing device 2 have similar arrangements, the similar arrangements will be denoted by the same reference numerals and a description thereof will be omitted.

In the second embodiment, the output of the switching means 50 is connected to a Z-axis driving unit 201' and a control means 210'. Further, the output of the switching means 80A is connected to Y- and X-axis driving units 202' and 203', and the control means 210'. In this connection structure, for example, the output of the switching means 80A is adapted to stop the non-contact probe 18 in the X-and Y-axis directions urgently while the movement in the Z-axis direction can continue or stop urgently by the control of the control means 210'. Therefore, the degree of the freedom for the control becomes high and suitable control of the escape of the non-contact probe can be executed in more complicated situation.

Figure 7:
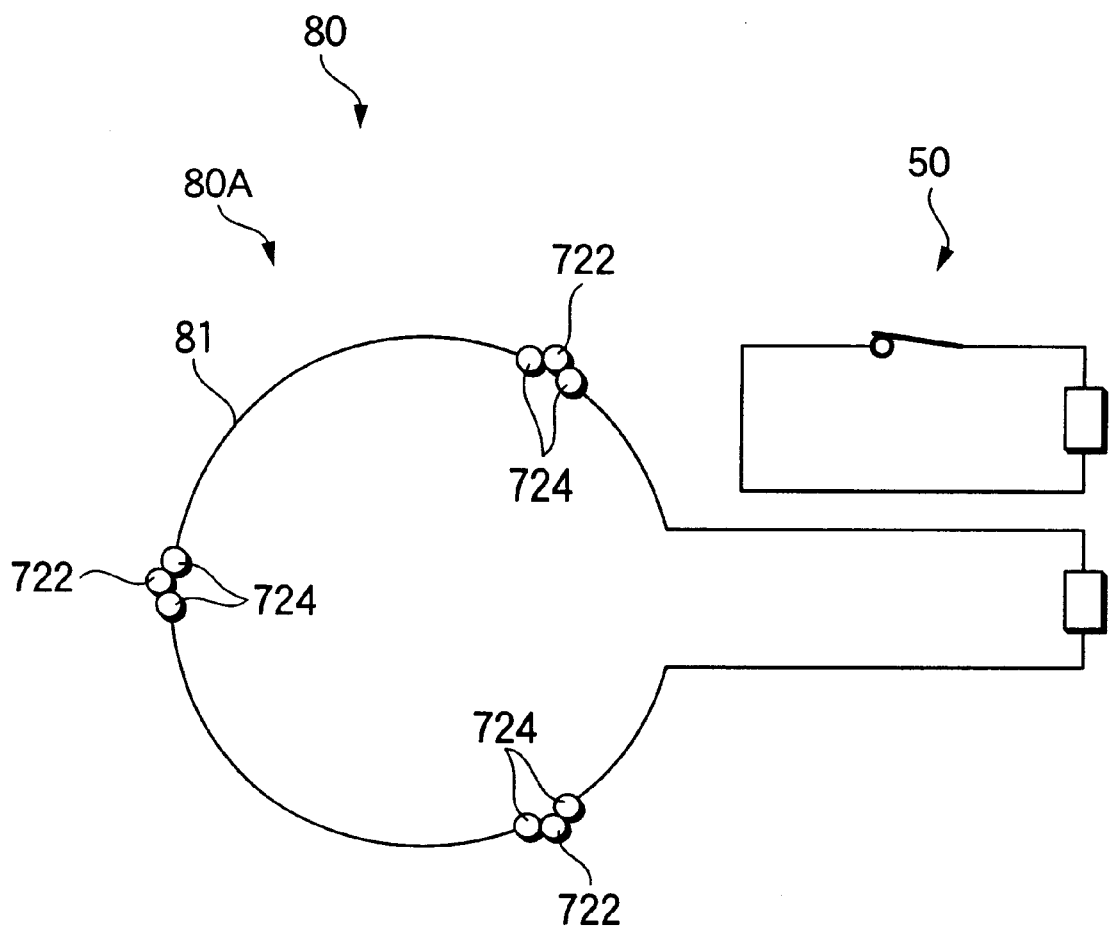
FIG. 7 is a schematic diagram illustrating first and second switching means of the embodiment.
Figure 8:
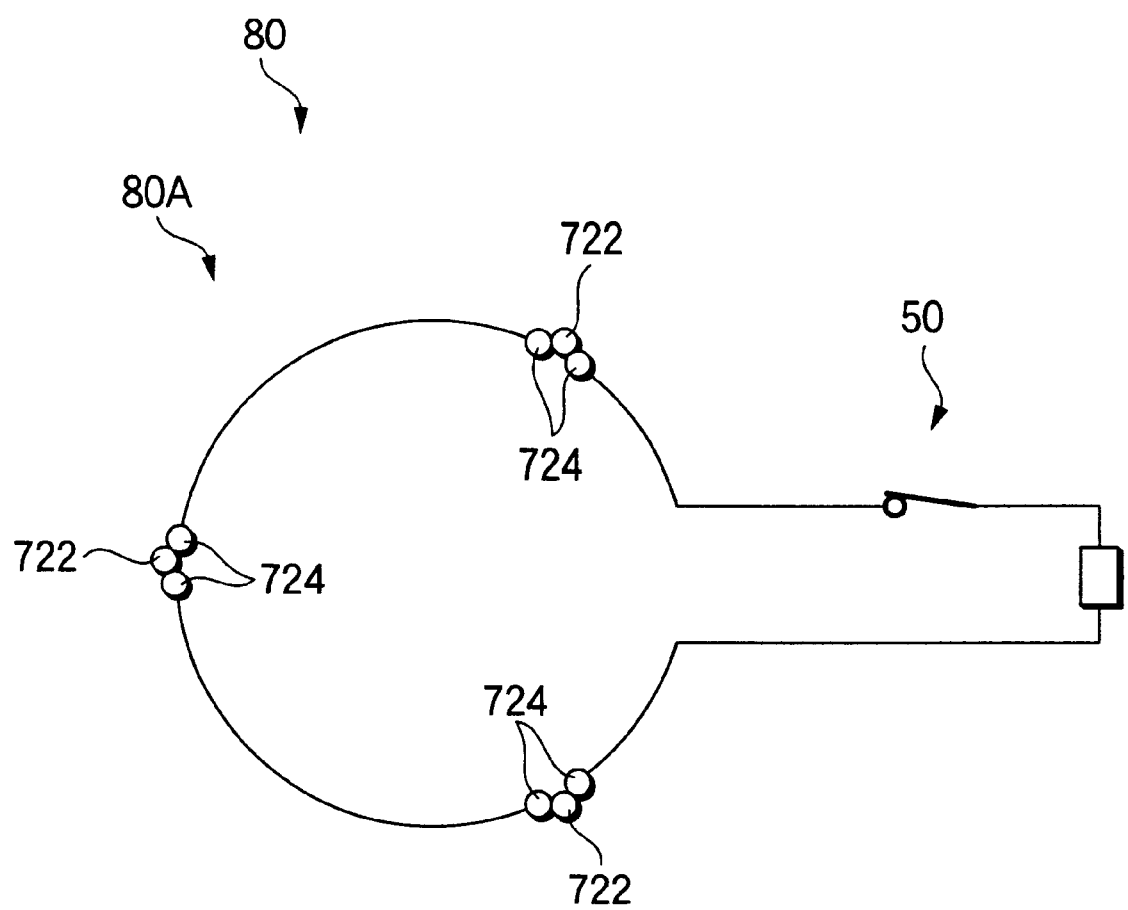
FIG. 8 is a schematic diagram illustrating another circuit (series) of the first and second switching means of the embodiment.

In FIGS. 7 and 8, the second switching means 80A has a collision detecting circuit 81. In the collision detecting circuit 81, the two rollers 724 and the ball 722 of the respective positioning means 72A are set as contacts, and the contacts are electrically arranged in series. Upon detecting the open state of this collision detecting circuit 81, the second switching means 80A is adapted to command the driving system 200' to stop the movement of the non-contact probe 18 or move the non-contact probe 18 in the escape direction. Specifically, the collision detecting circuit 81 is set in the open state when, in at least one of the three positioning means 72A, the contacts of the rollers 724 and the ball 722 are separated.

As shown in FIG. 7, by providing the collision detecting circuit 81 electrically separately from the first switching means 50, the commands for the driving system 200' can be made different between the first switching means 50 and the second switching means 80A. Specifically, the first switching means 50 is capable of transmitting to the driving system 200' the command for moving the non-contact probe 18 in the escape direction, while and the second switching means 80A is capable of transmitting to the driving system 200' the command for stopping the movement of the non-contact probe 18. On the other hand, as shown in FIG. 8, by providing the collision detecting circuit 81 and the first switching means 50 electrically in series, the first switching means 50 and the second switching means 80A are capable of transmitting the same commands to the driving system 200'.

Next, a description will be given of the operation of this embodiment.

When the non-contact probe 18 is lowered in the Z-axis direction by the driving system 200' (see FIG. 3), and is further lowered from a position where the non-contact probe 18 is close to the work, the collision detecting portion 30 of the collision preventing device 3 firstly collides against the work. Then, the intermediate member 711 which is nondisplaceable in the Z-axis direction with respect to the collision detecting portion 30 Is also moved upwardly, so that a relative displacement in the Z-axis direction occurs between the holder 20 and the intermediate member 711. Namely, a relative displacement occurs between the holder 20 and the collision detecting portion 30. Then, in the same way as the collision preventing device 2, a command is sent to the driving system 200' from the first switching means 50, thereby stopping the lowering of the non-contact probe 18 or raising the non-contact probe 18.

Meanwhile, in FIG. 9, when the non-contact probe 18 is moved in the X- and Y-axis directions by the driving system 200', and is further moved at a position where the non-contact probe 18 is close to the work, the collision detecting portion 30 of the collision preventing device 3 firstly collides against the work. When the collision detecting portion 30 collides against the work, the collision detecting portion 30 relatively moves in a direction opposite to the moving direction of the non-contact probe against the helical extension spring 72B, so that a relative displacement occurs in the X- and Y-axis directions between the intermediate member 711 and the collision detecting portion 30 (i.e., between the holder 20 and the collision detecting portion 30). For this reason, the contacts of the rollers 724 and the ball 722 are separated in any one of the three positioning means 72A. Then, a command for stopping the movement of the non-contact probe 18 or moving the non-contact probe 18 in the escape direction is transmitted from the second switching means 80A to the driving system 200'. Namely, the movement of the non-contact probe 18 is stopped, or the non-contact probe 18 is moved in the escape direction.

In accordance with the above-described embodiment, the following advantages can be obtained in addition to the advantages (1) and (2) of the first embodiment.

(3) In the non-contact view measuring CMM 1 having the X-axis driving system 200', the Y-axis driving system, and the Z-axis driving system for respectively moving the non-contact probe 18 in the X-, Y-, and Z-directions that are perpendicular to each other, the collision preventing device 3 is capable of detecting collisions not only in the X-axis direction but also in the Y- and Z-axis directions, it is possible to reliably prevent the breakage of the non-contact probe 18 and the main body of the non-contact view measuring CMM 1.

In addition, since commands for stopping the movement of the non-contact probe 18 or for moving the non-contact probe 18 in the escape direction can be transmitted to the Z-, X-, and Y-axis driving systems, respectively, it is possible to transmit optimal commands to the respective driving systems. Specifically, during a collision, in the Z-axis direction the non-contact probe 18 is moved in the escape direction, while in the X- and Y-axis directions the movement of the non-contact probe 18 is stopped to avoid contact with the work in a case where a step or the like is present in the work.

(4) The collision from any three-dimensional direction can be detected since there are provided the Z-axis holding means 71 for holding the collision detecting portion 30 displaceably and returnably in the Z-axis direction with respect to the holder 20 as well as the X-Y-axis holding means 71 for holding the collision detecting portion 30 displaceably and returnably in the X- and Y-axis direction with respect to the holder 20.

(5) In the collision in the X- and Y-axis directions, when the non-contact probe 18 is moved in the X- and Y-axis directions, the collision detecting portion 30 collides against the work, and a relative displacement occurs in the X- and Y-axis directions between the collision detecting portion 30 and the holder 20. Specifically, since the collision detecting portion 30 tends to be displaced in the X- and Y-axis directions with respect to the intermediate member 711 against the helical extension spring 72B, the ball 722 and the rollers 724 of the positioning means 72A are separated from each other, and a relative displacement occurs in the X- and Y-axis directions between the collision detecting portion 30 and the intermediate member 711. Since the intermediate member 711 is nondisplaceable in the X- and Y-axis directions with respect to the holder 20 by means of the shafts 41 and 41A, a relative displacement also occurs in the X- and Y-axis directions between the collision detecting portion 30 and the holder 20. If the non-contact probe 18 is escaped, the collision detecting portion 30 is returned to its original position by means of the helical extension spring 72B, and the ball 722 and the rollers 724 of the positioning means 72A are engaged with each other. Since the positioning means 72A comprised of the ball 722 and the two rollers 724 are used, it is possible to effect the positioning of the collision detecting portion 30 with respect to the holder 20 (intermediate member 711) with high accuracy.

(6) Since the second switching means 80A uses the ball 722 and the rollers 724 of the positioning means 72A as the contacts, it is possible to reduce the number of component parts as compared with the case where a switching means is provided separately, and this arrangement is economical in terms of cost.

It should be noted that the invention is not limited to the foregoing embodiments, and modifications and improvements which fall within the scope which can attain the object of the invention are included in the invention.

Figure 12:
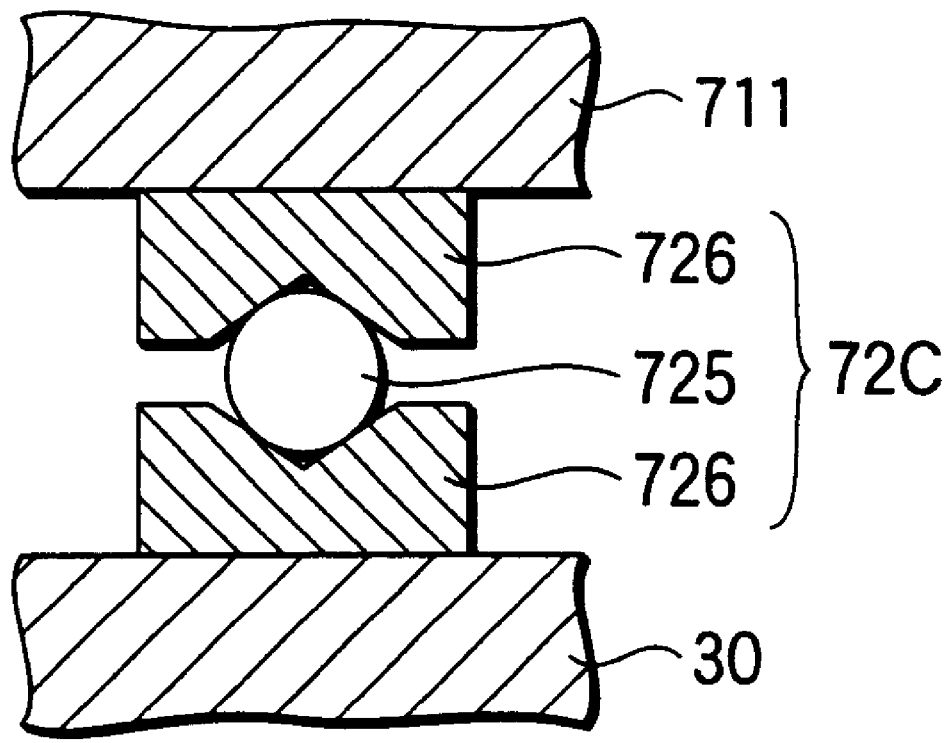
FIG. 12 is a cross-sectional view illustrating a modification of a positioning means of the embodiment.

For example, although, in the above-described embodiment, the three positioning means 72A each comprised of the ball 722 and the two rollers 724 are arranged between the intermediate member 711 and the collision detecting portion 30, the positioning means in accordance with the invention is not limited to the same. For example, one of the three positioning means may be provided as a first positioning means 72A including the ball 722 and the rollers 724, and the remaining two positioning means may be provided as second positioning means 72C, as shown in FIG. 12.

The second positioning means 72C has a ball 725 disposed between the intermediate member 711 and the collision detecting portion 30 and a pair of holding members 726 disposed respectively on the intermediate member 711 and the collision detecting portion 30 so as to clamp the ball 725. Of these members, the surfaces of the holding members 726 for clamping the ball 725 are respectively formed in substantially conical shapes. Since the pair of holding members 726 provided on the intermediate member 711 and the collision detecting portion 30 clamp the ball 725 at their substantially conical surfaces, the collision detecting portion 30 is displaceable in the X- and Y-axis directions and in the Z-axis direction with respect to the intermediate member 711.

If the above-described second positioning mean 72C is used, the second switching means 80A has a collision detecting circuit in which the ball 722 and the two rollers 424 of the first positioning means 72A and the ball 725 and the pair of holding members 726 of each of the second positioning means 72C are used as contacts, and the contacts are arranged electrically in series. For example, when the collision detecting portion 30 collides against the work, the collision detecting portion 30 is tilted in terms of its attitude. As a result, the ball 725 and the holding members 726 of the second positioning means 72C are separated from each other, so that the collision detecting circuit is set in the open state.

The first positioning means 72A comprised of the ball 722 and the two rollers 724 and the second positioning means 72C comprised of the ball 725 and the pair of holding members 726 having substantially conical surfaces are used as the positioning means. Namely, since at least two of the at least three positioning means arranged between the intermediate member 711 and the collision detecting portion 30 are formed by the second positioning means 72C having a simple structure, the positioning means can be easily and economically constructed.

Although the contact type is adopted for the respective switching means 50 and 80A in the above-described embodiments, it is possible to use a light sensor, a proximity switch or the like using the known techniques. In other words, it suffices if the relative displacement between the holder and the collision detecting portion can be detected.

Although in the above-described embodiments the collision preventing device 2 for detecting the collision only in the Z-axis direction and the collision preventing device 3 for detecting the collision in the three-dimensional direction have been cited, the collision preventing device in accordance with the invention is not limited to the same. For example, the collision preventing device may be one for detecting the collision only in the X-axis direction or in the Y-axis direction. In other words, it suffices if the collision preventing device is comprised of the mechanism for detecting the relative displacement between the holder attached to the non-contact probe and the annular collision detecting portion covering the non-contact probe, and for commanding the driving system of the measuring apparatus to stop the movement of the non-contact probe or move the non-contact probe in the escape direction at the time of the detection. The direction of the collision to be detected may be appropriately determined according to the measuring apparatus.

Although in the above-described embodiments the collision preventing device 2 or 3 is attached to the non-contact view measuring CMM 1 wherein the non-contact probe 18 is moved, the collision preventing device may be also used for a measuring apparatus wherein the work is moved or in a measuring apparatus wherein both the non-contact probe and the work are moved.

Figure 10A:
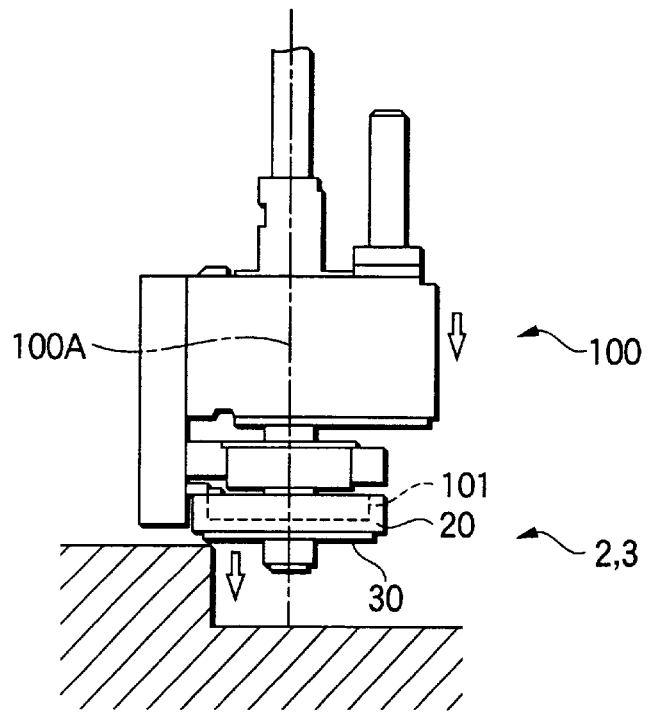
FIGS. 10A–B are respectively side elevational views illustrating a modification (parabolic mirror)
Figure 10B:
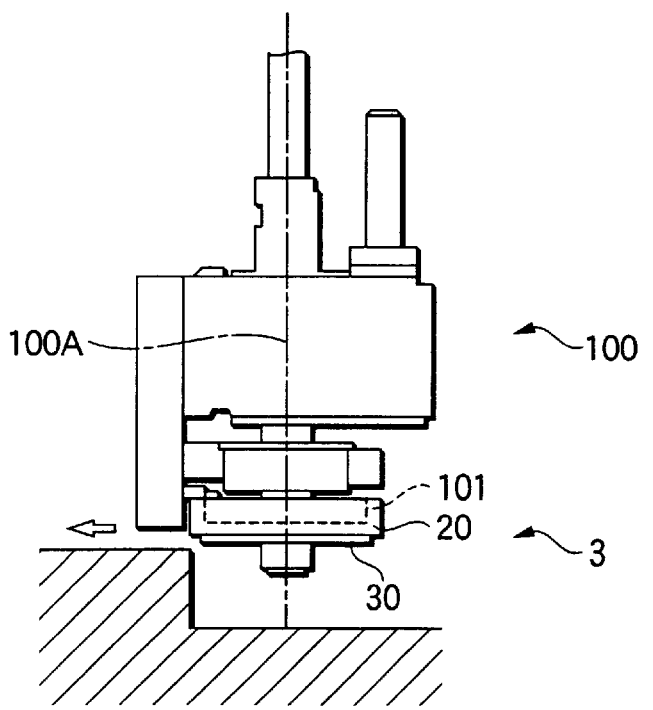

Although in the above-described embodiments the non-contact probe 18 is comprised of a CCD camera 181 and the objective 182, the non-contact probe in accordance with the invention is not limited to the same, and may be a non-contact probe having a mechanism for radiating light from the outside diagonally with respect to the axial direction, such as a non-contact probe 100 shown in FIGS. 10A–B. This non-contact probe 100 has a parabolic mirror 101 disposed on the outer side of its axial direction 100A, and the light is reflected diagonally onto the axial direction 100A by the parabolic mirror 101. By at aching the collision detecting portion 2 or 3 on the parabolic mirror 101, the breakage of the parabolic mirror 101 and the like can be prevented.

Figure 11A:
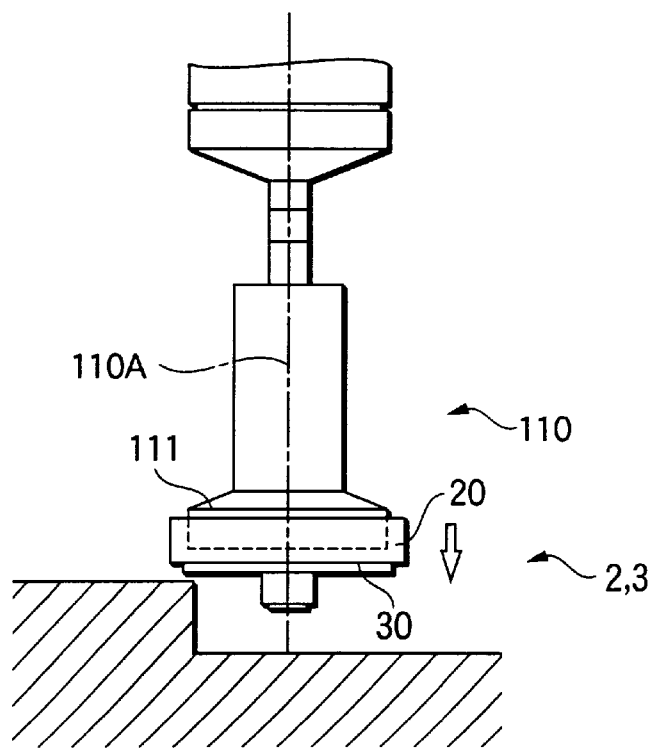
FIGS. 11A–B are respectively side elevational views illustrating another modification (light)
Figure 11B:
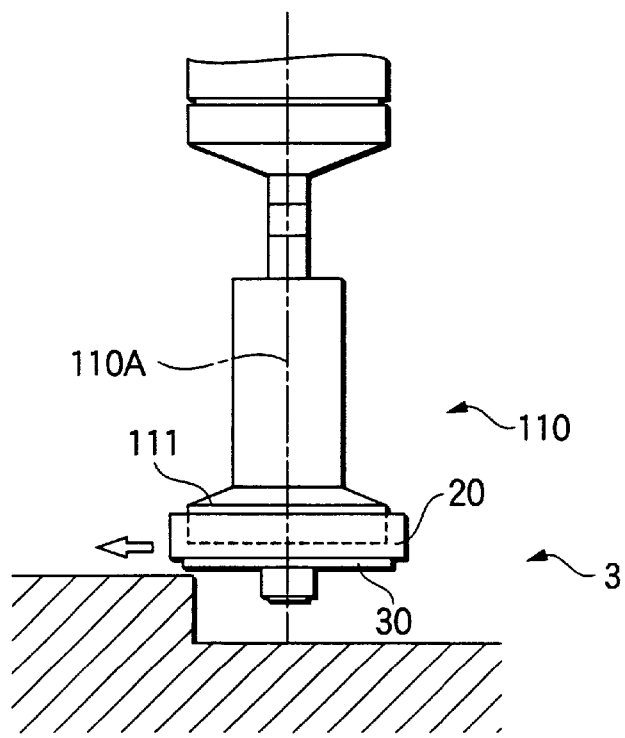

Further, the non-contact probe may be a non-contact probe 110 such as the one shown in FIGS. 11A–B. This non-contact probe 110 has an annular light 111 disposed on the outer side of its axial direction 110A and adapted to illuminate the work from a diagonal direction. By attaching the collision preventing device 2 or 3 to this annular light 111, it is possible to prevent the breakage of the light 111 and the like.

Furthermore, the non-contact probe may be a non-contact probe of a laser displacement gage for measuring the configuration of the surface of the work by applying laser light to the work through an objective while vertically moving the objective such that the surface of the work is constantly located at the focal point of the objective.

Still further, the non-contact probe may be a device of a combination measuring apparatus having a number of devices serving as non-contact probes and provided with a mechanism whereby the devices are stored except when necessary, and a device is used by being moved to a normal position when necessary.

In short, it suffices if the non-contact probe is that of a measuring apparatus for measuring the dimensions and the like of the work while relatively moving the work and the non-contact probe by the driving system.

Although in the above-described embodiments the non-contact view measuring CMM is cited as the measuring apparatus, the measuring apparatus is not limited to the same, and it suffices if the measuring apparatus is one for measuring the dimensions and the like of the work while relatively moving the non-contact probe and the work by the driving system. Thus not only the three-dimensional measuring apparatus but also a two-dimensional measuring apparatus and a one-dimensional measuring apparatus are also included. Further, the measuring apparatus include a roundness measuring machine or a surface texture measuring machine which measure surface roughness, waviness or profile. In accordance with the collision preventing device for a measuring apparatus of the invention, when the non-contact probe has approached the work or the like, the collision detecting portion covering the non-contact probe collides against the work or the like, it is possible to prevent the breakage of the non-contact probe and the main body of the measuring apparatus due to the collision. In addition, since the relative displacement between the holder attached to the non-contact probe and the collision detecting portion is immediately detected, and the relative movement of the work and the non-contact probe is stopped or the work and the non-contact probe are relatively moved in the escape direction, it is possible to prevent the breakage of the work and the like due to the collision.

What is claimed is:

1. A collision preventing device for a measuring apparatus for measuring dimensions of a work while relatively moving the work and a non-contact probe by a driving system, the collision preventing device comprising:

a holder attached to the non-contact probe;

a collision detecting portion covering the non-contact probe;

holding means for holding said collision detecting portion displaceably with respect to said holder; and a switch for detecting a relative displacement between said holder and said collision detecting portion and for commanding the driving system to stop the relative movement of the work and the non-contact probe or relatively move the work and the non-contact probe in a escape direction in which the work and the non-contact probe separate from each other.

2. The collision preventing device according to claim 1, wherein said holding means includes first holding means for holding said collision detecting portion displaceably in a first direction with respect to said holder, said first holding means having: a sliding member fixed to one of said holder and said collision detecting portion at one end thereof and attached to the other of said holder and said collision detecting portion at the other end thereof slidably in the first direction; and a first resilient member disposed between said holder and said collision detecting portion and holding said collision detecting portion displaceably in the first direction with respect to said holder, and said switch includes a first switch for detecting a relative displacement between said holder and said collision detecting portion in the first direction.

3. The collision preventing device according to claim 2, wherein said holding means includes second holding means for holding said collision detecting portion displaceably in a second direction perpendicular to the first direction with respect to said holder, said second holding means having: an intermediate member disposed between said holder and said collision detecting portion; at least one positioning means disposed said intermediate member and said collision detecting portion and for detecting a respective displacement between said holder and said collision detecting portion in the second direction; and a second resilient member disposed between said intermediate member and said collision detecting portion and holding said collision detecting portion displaceably in the second direction with respect to said holder, the sliding member is fixed to one of said holder and said intermediate member at one end thereof and attached to the other of said holder and said intermediate member slidably in the first direction at the other end thereof and the first resilient member is disposed between said holder and said intermediate member and holds said intermediate member displaceably in the first direction with respect to said holder, and said switch has a second switch for detecting the relative displacement between said holder and said collision detecting portion in the second direction.

4. The collision preventing device according to claim 3, wherein said positioning means includes: a ball disposed on one of said intermediate member and said collision detecting portion; and two rollers engaged with the ball and disposed on the other of said intermediate member and said collision detecting portion, and the second resilient member holds the ball and the two rollers engageably and disengageably.

5. The collision preventing device according to claim 4, wherein said second switch has: a collision detecting circuit having contacts formed between the ball and the two rollers of said positioning means and arranged electrically in series, and detects an open state of the collision detecting circuit and commands the driving system to stop the relative movement of the work and the non-contact probe in the second direction or relatively move the work and the non-contact probe in the escape direction.

6. The collision preventing device according to claim 3, wherein said positioning means has: a ball disposed on one of said intermediate member and said collision detecting portion; and a pair of holding member disposed respectively on said intermediate member and said collision detecting portion and clamping the ball between surfaces of the holding members respectively formed in substantially conical shapes, and the second resilient member holds the ball and the pair of the holding members engageably and disengageably.

7. The collision preventing device according to claim 6, wherein said second switch has a collision detecting circuit having contacts formed between the ball and the pair of holding member of said positioning means and arranged electrically in series, and detects an open state of the collision detecting circuit and commands the driving system to stop the relative movement of the work and the non-contact probe in the second direction or relatively move the work and the non-contact probe in the escape direction.

8. The collision preventing device according to claim 3, wherein the first switch and the second switch are arranged electrically in series.

9. The collision preventing device according to claim 3, wherein said positioning means comprises: at least one first positioning means having a ball disposed on one of said intermediate member and said collision detecting portion, and two rollers engaged with the ball and disposed on the other of said intermediate member and said collision detecting portion; and at least one second positioning means having a ball disposed on one of said intermediate member and said collision detecting portion, and a pair of holding member disposed respectively on said intermediate member and said collision detecting portion and clamping the ball between surfaces of the holding members respectively formed in substantially conical shapes, and the second resilient member holds the ball and the two rollers of the first positioning member engageably and disengageably.

10. The collision preventing device according to claim 2, wherein said first switch has: a switch portion having a lever swingably in the first direction; and a dog fixed to the sliding member and swing the lever on the basis of a movement of the sliding member, and detects a swing state of the lever and commands the driving system to stop the relative movement of the work and the non-contact probe in the first direction or relatively move the work and the non-contact probe in the escape direction.

11. The collision preventing device according to claim 1, wherein said collision detecting portion is ring-shaped.

12. The collision preventing device according to claim 1, wherein the non-contact probe is a parabolic mirror.

13. The collision preventing device according to claim 1, wherein the non-contact probe is an annular light.

14. A measuring apparatus for measuring dimensions of a work by a non-contact probe, comprising:

a driving system relatively moving the work and the non-contact probe; and a collision preventing unit for preventing the non-contact probe from colliding with the work, said collision preventing unit comprising:

a holder attached to the non-contact probe;

a collision detecting portion covering the non-contact probe;

holding means for holding said collision detecting portion displaceably with respect to said holder; and a switch for detecting a relative displacement between said holder and said collision detecting portion and for commanding the driving system to stop the relative movement of the work and the non-contact probe or relatively move the work and the non-contact probe in a escape direction in which the work and the non-contact probe separate from each other.

15. The measuring apparatus according to claim 14, wherein said driving system comprises:

an X-axis driving system relatively moving the work and the non-contact probe in an X-axis direction;

a Y-axis driving system relatively moving the work and the non-contact probe in a Y-axis direction perpendicular to the X-axis direction; and a Z-axis driving system for relatively moving the work and the non-contact probe in a Z-axis direction perpendicular to the X-axis direction and the Y-axis direction.

16. The measuring apparatus according to claim 15, wherein said holding means comprises:

Z-axis holding means for holding said collision detecting portion displaceably in the Z-axis direction with respect to said holder, said Z-axis holding means including an intermediate member disposed between said holder and said collision detecting portion, a sliding member fixed to one of said holder and said intermediate member at one end thereof and attached to the other of said holder and said intermediate member at the other end thereof slidably in the Z-axis direction, and a first resilient member disposed between said holder and said intermediate member and holding said intermediate member displaceably with respect to said holder; and X-Y-axis holding means for holding said collision detecting portion displaceably in the X- and Y-axis directions with respect to said holder, said X-Y-axis holding means includes at least three first positioning means having a ball disposed on one of said intermediate member and said collision detecting portion and two rollers engaged with the ball and disposed on the other of said intermediate member and said collision detecting portion, and a second resilient member disposed between said intermediate member and said collision detecting portion and holding the ball and the two rollers of said first positioning means engageably and disengageably.

17. The measuring apparatus according to claim 16, wherein said switch has a collision detecting circuit having contacts formed between the ball and the two rollers of said positioning means and arranged electrically in series, and detects an open state of the collision detecting circuit and commands the driving system to stop the relative movement in the X- and Y-axis directions or relatively move said work and said non-contact probe in the escape direction.

18. The measuring apparatus according to claim 15, wherein said holding means comprises:

Z-axis holding means for holding said collision detecting portion displaceably in the Z-axis direction with respect to said holder, said Z-axis holding means including an intermediate member disposed between said holder and said collision detecting portion, a sliding member fixed to one of said holder and said intermediate member at one end thereof and attached to the other of said holder and said intermediate member at the other end thereof slidably in the Z-axis direction, and a first resilient member disposed between said holder and said intermediate member and holding said intermediate member displaceably with respect to said holder; and X-Y-axis holding means for holding said collision detecting portion displaceably in the X- and Y-axis directions with respect to said holder, said X-Y-axis holding means including at least one first positioning means having a ball disposed on one of said intermediate member and said collision detecting portion and two rollers engaged with the ball and disposed on the other of said intermediate member and said collision detecting portion, a second positioning means having a ball disposed on one of said intermediate member and said collision detecting portion and a pair of holding member disposed respectively on the intermediate member and the collision detecting portion and clamping the ball between surfaces of the holding members respectively formed in substantially conical shapes, and a second resilient member disposed between said intermediate member and said collision detecting portion and holding the ball and the two rollers of said first positioning means engageably and disengageably.

* * * * *